United States Patent [19]

Buri et al.

[11] Patent Number: 5,390,347
[45] Date of Patent: Feb. 14, 1995

[54] RANGE CHANGE TRANSMISSION FOR VEHICLES

[75] Inventors: Gerhard Buri; Josef Bader, both of Friedrichshafen, Germany

[73] Assignee: Zahnradfabrik Friedrichshafen AG, Germany

[21] Appl. No.: 965,415

[22] PCT Filed: Jun. 29, 1991

[86] PCT No.: PCT/EP91/01218

§ 371 Date: Dec. 29, 1992

§ 102(e) Date: Dec. 29, 1992

[87] PCT Pub. No.: WO92/01173

PCT Pub. Date: Jan. 23, 1992

[30] Foreign Application Priority Data

Jul. 3, 1990 [DE] Germany ............... 4021170

[51] Int. Cl.⁶ .................. F16H 57/10; F16D 23/06
[52] U.S. Cl. ....................... 475/303; 475/317; 192/53 F; 192/53 G
[58] Field of Search .............. 475/303, 317; 192/53 F, 192/53 G

[56] References Cited

U.S. PATENT DOCUMENTS

| | | |
|---|---|---|
| Re. 33,428 | 11/1990 | Larsson . |
| 1,983,834 | 12/1934 | Barns ............................ 475/303 OR |
| 2,504,409 | 4/1950 | Haefeli ........................ 192/53 GOR |
| 2,515,010 | 7/1950 | Kishline ...................... 192/53 GOR |
| 4,182,202 | 1/1980 | Grey ............................. 475/303 OR |
| 4,667,538 | 5/1987 | Larsson . |
| 4,821,591 | 4/1989 | Adler ........................... 475/303 X |
| 5,022,506 | 6/1991 | Philippe .................... 192/53 GOR |
| 5,083,993 | 1/1992 | Öun ............................ 192/53 F X |

FOREIGN PATENT DOCUMENTS

| | | |
|---|---|---|
| 907349 | 6/1944 | France . |
| 2530545 | 1/1977 | Germany . |
| 3320431 | 12/1983 | Germany . |

*Primary Examiner*—Rodney H. Bonck
*Assistant Examiner*—Daniel Wittels
*Attorney, Agent, or Firm*—Davis, Bujold & Streck

[57] ABSTRACT

In a range change transmission for vehicles which is designed as planetary transmission (2), a sun gear (3) is driven by a drive shaft (4) of an added basic transmission while a planet carrier (8) of the planetary transmission (2) is rigidly connected with an output shaft (9) of the range change transmission. To engage a low ratio group of the range change transmission, a ring gear (6) is connected with a transmission casing (1) by means of a sliding sleeve (25). In a direct through drive, the sliding sleeve (25) connects the ring gear (6) with a planet carrier (8). The construction costs should be reduced by using a single-piece synchronizer ring (22), the single-piece synchronizer ring which is effective for both shift directions cooperating by both its friction faces (23) with bevel faces (18 and 19) on the transmission casing (1) and on the planet carrier (8).

10 Claims, 1 Drawing Sheet

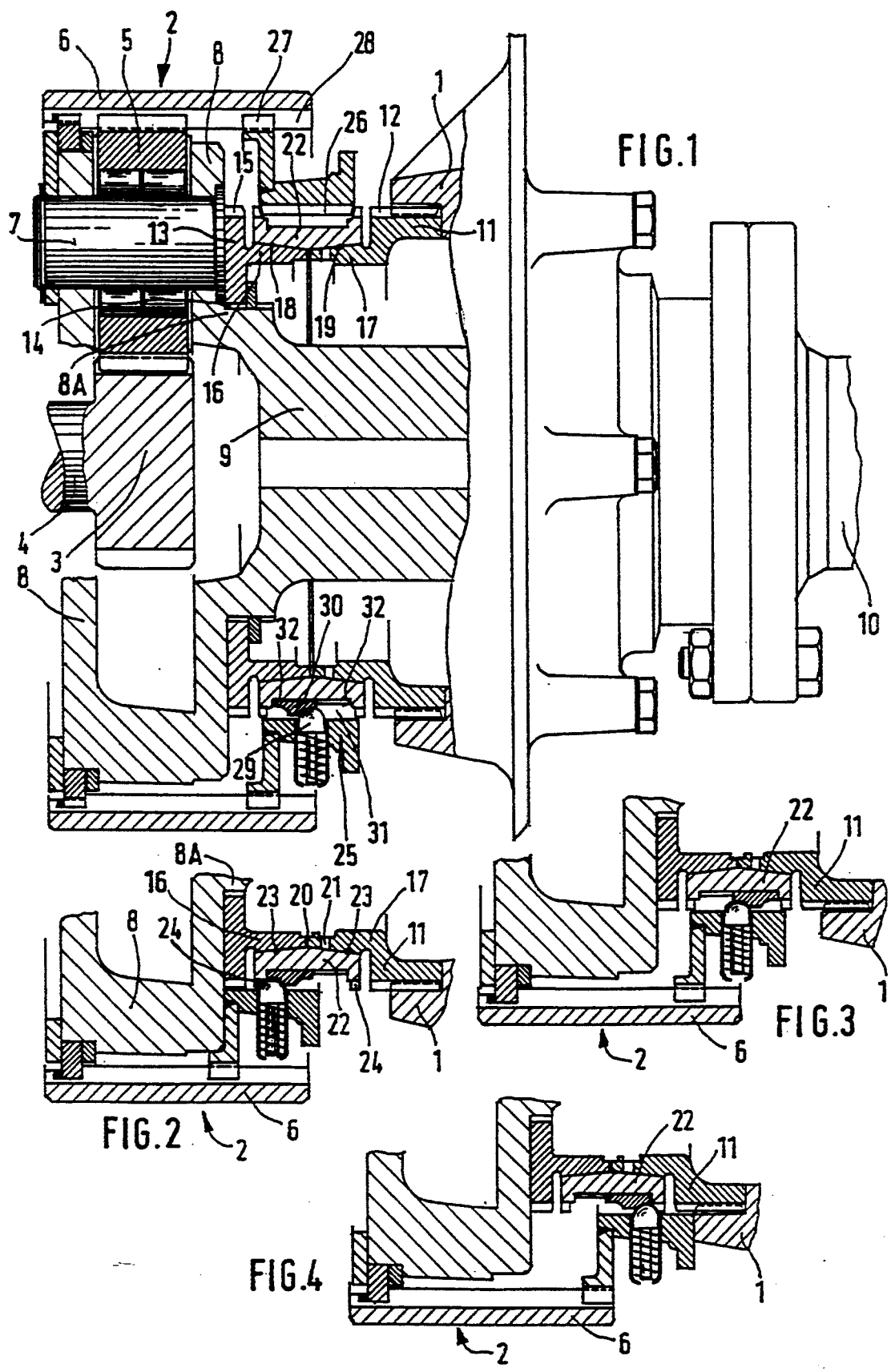

AUTOMOTIVE AUTOMATIC TRANSMISSION

BACKGROUND OF THE INVENTION

1. Field of the Invention

The present invention relates in general to automatic transmissions for motor vehicles, and more particularly to automotive automatic transmissions of a type which is equipped with a park-lock mechanism.

2. Description of the Prior Art

One of conventional automotive automatic transmissions of the above-mentioned type is shown in Japanese Patent First Provisional Publication 60-84469. In this transmission, a parking gear which constitutes part of the park-lock mechanism is integral with an input gear mounted on one end of a countershaft of the transmission. Essential parts of the transmission are arranged about a main shaft which is coaxial with the crankshaft of the engine, and the countershaft is arranged in parallel with the main shaft. The torque from the engine is transmitted through the input gear to the countershaft and the torque of the countershaft is transmitted through a final drive gear mounted on the other end of the countershaft to a final drive mechanism. That is, the parking gear is integrally and coaxially formed on one side surface of the input gear of the countershaft. When a parking pawl pivotally held by a transmission casing is engaged with the parking gear, the countershaft is locked and thus drive wheels of the motor vehicle are locked.

However, provision of the parking gear on the side surface of the input gear of the countershaft tends to increase the entire length of the countershaft and thus cause a longitudinally bulky construction of the transmission. In fact, such elongated countershaft narrows an effective space for accommodating other parts of the transmission.

SUMMARY OF THE INVENTION

It is therefore an object of the present invention to provide an automotive automatic transmission which is free of the above-mentioned drawback.

According to the present invention, there is provided an automotive automatic transmission in which the parking gear is integrally formed on a cylindrical outer surface of a clutch drum of the transmission.

According to a first aspect of the present invention, there is provided an automotive automatic transmission which comprises a transmission mechanism including a casing, an output shaft and a clutch drum, the clutch drum being connected to the output shaft to rotate therewith relative to the casing; a final drive mechanism to which a torque of the output shaft is transmitted; a parking gear which is formed on a cylindrical outer surface of the clutch drum; and a parking pawl which is pivotally held by the casing and engageable with the parking gear to lock the same.

According to a second aspect of the present invention, there is provided an automotive automatic transmission which comprises a torque converter; a main transmission mechanism including an input shaft to which a torque is transmitted from the torque converter, an intermediate output shaft and first and second planetary gear units coaxially disposed about the intermediate output shaft to transmit the torque of the input shaft to the intermediate output shaft while changing the rotation speed ratio therebetween; a sub-transmission mechanism including a casing, an input gear powered by the intermediate output shaft, an output shaft, a third planetary gear unit coaxially disposed about the output shaft to transmit the torque of the input gear to the output shaft while changing the rotation speed ratio therebetween and a clutch drum incorporated with the third planetary gear unit, the clutch drum being connected to the output shaft to rotate therewith; a final drive mechanism to which a torque of said output shaft is transmitted; a parking gear which is formed on a cylindrical outer surface of the clutch drum; and a parking pawl which is pivotally held by the casing and engageable with the parking gear to lock the same.

BRIEF DESCRIPTION OF THE DRAWINGS

Other objects and advantages of the present invention will become apparent from the following description when taken in conjunction with the accompanying drawings, in which:

FIG. 1 is a schematic illustration of an automotive automatic transmission according to the present invention;

FIG. 2 is a TABLE showing ON/OFF condition of various friction elements of the transmission when the transmission assumes certain speeds; and FIG. 3 is a sectional view of a sub-transmission mechanism of the transmission.

DETAILED DESCRIPTION OF THE INVENTION

In FIG. 1, there is schematically shown an automotive automatic transmission according to the present invention.

The transmission comprises generally a torque converter 10, a main transmission mechanism 1, a sub-transmission mechanism 2 and a final drive mechanism 3.

The torque converter 10 converts a torque of an engine output shaft 12 and transmits the converted torque to an input shaft 13.

The main transmission mechanism 1 comprises the input shaft 13 to which the converted engine torque is fed, an intermediate output shaft 14 from which a drive power is transmitted to the sub-transmission mechanism 2, a first planetary gear unit 15, a second planatary gear unit 16, a front clutch 20, a rear clutch 22, a low-and-reverse brake 26, a band brake 28 and a low one-way clutch 30. The first planetary gear unit 15 comprises a sun gear S1, an internal gear R1, pinion gears P1 meshed with both the sun and internal gears S1 and R1 and a pinion carrier PC1 carrying the pinion gears P1, and the second planetary gear unit 16 comprises a sun gear S2, an internal gear R2, pinion gears P2 meshed with both the sun and internal gears S2 and R2 and a pinion carrier PC2 carrying the pinion gears P2. The parts are arranged in the illustrated manner. The band brake 28 is equipped with both a servo-apply chamber SA for effecting engagement of the band brake 28 and a servo-release chamber SR for effecting disengagement of the band brake 28. The servo-release chamber SR has a pressure receiving area larger than that of the servo-apply chamber SA.

The sub-transmission mechanism 2 comprises a third planetary gear unit 31, a direct clutch 32 and a reduction brake 33. The third planetary gear unit 31 comprises a sun gear S3, an internal gear R3, pinion gears P3 meshed with both the sun and internal gears S3 and R3 and a pinion carrier PC3 carrying the pinion gears P3. The internal gear R3 is engaged with the intermediate output shaft 14 through mutually meshed gears 37 and 38, and thus the torque of the intermediate output shaft 14 is transmitted to the internal gear R3. The sun gear S3 is connectable to the pinion carrier PC3 through the direct clutch 32. Furthermore, the sun gear S3 is connectable to a fixed portion (viz., casing 66) through the reduction brake 33. A one-way clutch 36 is arranged in parallel with the reduction brake 33. The pinion carrier PC3 is constantly engaged with an output shaft 35. The output shaft 35 is equipped with a drive pinion 39 to which a final drive gear 40 of the final drive mechanism 3 is engaged.

By operating the clutches 20 and 22 and the brakes 26, 28 and 33 in various combinations, operation conditions of the first, second and third planetary gear units 15, 16 and 31 are changed and thus the rotation speed ratio of the output shaft 35 relative to the input shaft 13 is changed. That is, by engaging or disengaging the clutches 20, 22 and 32, the brakes 26, 28 and 33 and the one-way clutches 30 and 36 in a manner as shown in the TABLE of FIG. 2, four forward speeds and one reverse are obtained by the transmission. In the TABLE, the mark "o" indicates an "engaged condition" of the corresponding friction element, and the mark "(o)" indicates an "engaged condition" which takes place only when a shift lever of the transmission is in "L(low)-range".

In FIG. 3, there is shown a sectional view of the sub-transmission mechanism 2 of the transmission.

As shown, the gear 38 of the mechanism 2 is constantly meshed with the output gear 37 of the main transmission mechanism 1. The gear 38 is connected with the internal gear R3 to form a single unit. The gear 38 is rotatably supported by a casing 54 through a bearing 53. The pinion carrier PC3 is spline-connected to a clutch drum 55 to rotate integrally therewith. The clutch drum 55 is spline-connected to the output shaft 35 of the sub-transmission mechanism 2 to rotate integrally therewith.

It is to be noted that the clutch drum 55 is formed on a cylindrical outer surface thereof with a parking gear 90. As is shown in FIG. 3, the outer diameter of the parking gear 90 is smaller than that of the largest diameter part (viz., the part indicated by the arrow 32) of the clutch drum 55. As shown in FIG. 3, a parking pawl 100 is pivotally held by a casing 66 of the sub-transmission mechanism 2 near the parking gear 90. That is, the parking pawl is engageable with the parking gear 90 to lock the same.

The output shaft 35 is integrally formed with the drive pinion 39 which is meshed with the final drive gear 40. The output shaft 35 is rotatably supported by a casing 61 through bearings 59 and 60.

The clutch drum 55 has a piston 62 slidably received in a cylinder portion thereof. Upon energization, the piston 62 can apply a suitable engaging force to clutch plates 63 of the clutch 32. When the clutch plates 63 are thus engaged, a hub 64 rotated integrally with the sun gear S3 becomes to rotate together with the clutch drum 55. That is, when the piston 62 is pressed by a hydraulic power in a direction to engage the clutch plates 63, the pinion carrier PC3 and the sun gear S3 are coupled to rotate together like a single unit.

As shown in FIG. 3, the sun gear S3 has at its Left end a hub plate 65 secured thereto. The hub plate 65 is connectable to the casing 66 through the reduction brake 33. The reduction brake 33 comprises a piston 67 and brake plates 68. The brake plates 68 comprise a first group of plates spline-connected to the hub plate 65 and a second group of plates spline-connected to the casing 66, these plates being arranged alternately. Thus, when the piston 67 is pressed by a hydraulic power in a direction to engage the brake plates 68, the hub plate 65 becomes fixed to the casing 66.

The casing 66 has at its center part a boss portion 70 on which an inner race 71 of the one-way clutch 36 is mounted. That is, the inner race 71 is spline-connected to a cylindrical outer surface of the boss portion 70, and axial displacement of the inner race 71 is suppressed by an inner wall of the casing 66 and a snap ring 72. Around the inner race 71, there is mounted a wedge structure 73. Around the wedge structure 73, there is mounted an outer race 74. Between a space defined between left surfaces of the outer race 74 and the wedge structure 73 and an inner surface of the casing 66, there is disposed a bearing 75. A right end portion of the wedge structure 73 is in contact with the hub plate 65. A right end surface of the outer race 74 is formed with a plurality of projections 74a which are engaged with corresponding openings formed in the hub plate 65. The remaining portion of the right end surface of the outer race 74, which is free of the projections 74a, is in contact with the hub plate 65. Because of engagement of the projections 74a of the outer race 74 with the openings of the hub plate 65, the outer race 74 and the hub plate 65 can rotate together like a single unit.

In the following, operation of the sub-transmission mechanism 2 will be described with reference to FIG. 3.

When, with the direct clutch 32 kept disengaged, a torque is transmitted from the gear 37 to the gear 38, the internal gear R3 is forced to rotate in a given direction. However, due to the work of the one-way clutch 36 incorporated with the hub plate 65, the sun gear S3 is suppressed from making a rotation in the direction identical to that of the internal gear R3. Thus, under this condition, the pinion carrier PC3 is rotated at a reduced speed and the rotation of the pinion carrier PC3 is transmitted through the clutch drum 55 to the output shaft 35. With this, a speed reduction is effected by the sub-transmission mechanism 2. When an engine brake is carried out, the one-way clutch 36 runs idle. Thus, at such engine brake, the reduction brake 33 is engaged to fix the hub plate 65, and thus, the speed reduction is also achieved.

When the direct clutch 32 is engaged and the reduction brake 33 is disengaged, the sun gear S3 and the pinion carrier PC3 are coupled to rotate together like a single unit, and the internal gear R3 is rotated together with them. Accordingly, the rotation of the gear 38 is directly transmitted to the output shaft 35 without making a speed difference therebetween. Thus, a so-called "direct connection" is effected in the sub-transmission mechanism 2.

When a shift lever (not shown) of the transmission is moved to a parking position, the parking pawl 100 is brought into engagement with the parking gear 90 to lock the same. Since the clutch drum 55 on which the parking gear 90 is formed is spline-connected to the output shaft 35, the locking of the parking gear 90 locks the output shaft 35 and thus locks the drive wheels (not shown) of the associated motor vehicle.

What is claimed is:

1. An automative automatic transmission comprising:
   a transmission mechanism including a casing, an output shaft and a clutch drum, said clutch drum being connected to said output shaft to rotate therewith relative to said casing:
- a final drive mechanism to which a torque of said output shaft is transmitted;
- a parking gear formed on a cylindrical outer surface of said clutch drum, said parking gear being integral with said clutch drum; and
- a parking pawl which is pivotally held by said casing and engageable with said parking gear to lock the same,
- wherein the outer diameter of said parking gear is smaller than that of the largest diameter part of said clutch drum.

2. An automotive transmission as claimed in claim 1, in which said clutch drum is arranged to achieve a direct connection between an input element of said transmission mechanism and said output shaft.

3. An automotive automatic transmission as claimed in claim 1 in which said clutch drum is of an integral body which has a fluid-filled piston chamber defined therein.

4. An automotive automatic transmission as claimed in claim 3, in which said clutch drum and said output shaft are connected by means of a spline connection.

5. An automotive automatic transmission comprising:
- a torque converter;
- a main transmission mechanism including an input shaft to which a torque is transmitted from said torque converter, an intermediate output shaft and first and second planetary gear units coaxially disposed about said intermediate output shaft to transmit the torque of said input shaft to said intermediate output shaft while changing the rotation speed ratio therebetween;
- a sub-transmission mechanism including a casing, an input gear powered by said intermediate output shaft, an output shaft, a third planetary gear unit coaxially disposed about said output shaft to transmit the torque of said input gear to said output shaft while changing the rotation speed ratio therebetween and a clutch drum incorporated with said third planetary gear unit, said clutch drum being connected to said output shaft to rotate therewith;
- a final drive mechanism to which a torque of said output shaft is transmitted;
- a parking gear formed on a cylindrical outer surface of said clutch drum, said parking gear being integral with said clutch drum;
- a parking pawl which is pivotally held by said casing and engageable with said parking gear to lock the same,
- wherein the outer diameter of said parking gear is smaller than that of the largest diameter part of said clutch drum.

6. An automotive automatic transmission as claimed in claim 5, in which said clutch drum of the sub-transmission mechanism is of an integral body which has a fluid-filled piston chamber defined therein.

7. An automotive automatic transmission comprising:
- a transmission mechanism including a casing, an output shaft and a clutch drum, said clutch drum being connected to said output shaft to rotate therewith relative to said casing;
- a final drive mechanism to which a torque of said output shaft is transmitted;
- a parking gear formed on a cylindrical outer surface of said clutch drum; and
- a parking pawl pivotally held by said casing and engageable with said parking gear to lock the same,
- wherein said clutch drum and said output shaft are connected by means of a spline connection.

* * * * *